United States Patent [19]

Buel

[11] 4,248,367
[45] Feb. 3, 1981

[54] CONVERTIBLE PACK ASSEMBLY

[76] Inventor: G. Theodore Buel, R. 23 Little Rive Dr., Knoxville, Tenn. 37920

[21] Appl. No.: 48,697

[22] Filed: Jun. 14, 1979

[51] Int. Cl.³ .......................................... A47D 13/02
[52] U.S. Cl. .................................... 224/153; 224/155
[58] Field of Search ............... 224/153, 155, 185, 272, 224/209, 210, 211, 212, 213, 31, 32, 33 R, 153, 155

[56] References Cited

U.S. PATENT DOCUMENTS

| | | | |
|---|---|---|---|
| 3,250,449 | 5/1966 | Woodman | 224/155 |
| 3,786,972 | 1/1974 | Alley | 224/153 X |
| 3,989,173 | 11/1976 | Gebhard | 224/155 |
| 4,037,763 | 7/1977 | Turchen | 224/153 |

OTHER PUBLICATIONS

Pak Foam Products, Trek Pak, 7/76.

Primary Examiner—Steven M. Pollard
Attorney, Agent, or Firm—Emory L. Groff, Jr.

[57] ABSTRACT

A pack assembly includes a plurality of frame sections each having side braces connected by pivotal joints and provided with a shiftable pack mount including slidable locking sleeves. With the pack mount in a first position juxtaposed an intermediate one of the frame sections, the sleeves overlie the pivotal joints to retain the pack assembly in an extended back pack mode and when the pack mount is axially displaced along the side braces to an adjacent frame section uncovering the pivotal joints, the frame sections are angularly displaceable about the pivotal joints to provide a pack assembly of inverted U-shaped configuration adaptable for transporting astride a vehicle wheel.

10 Claims, 6 Drawing Figures

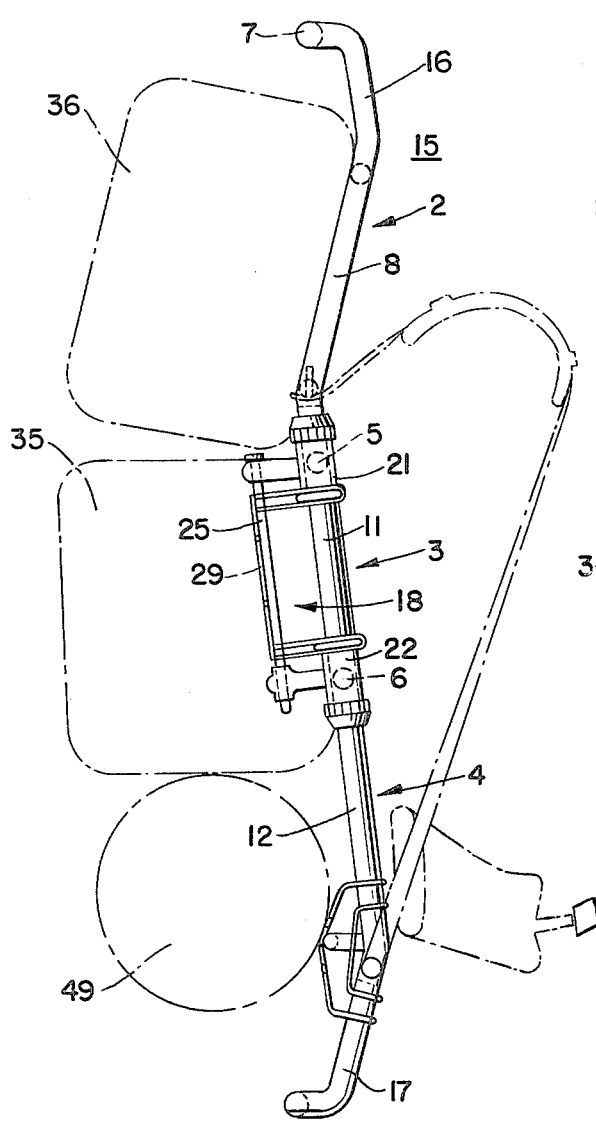
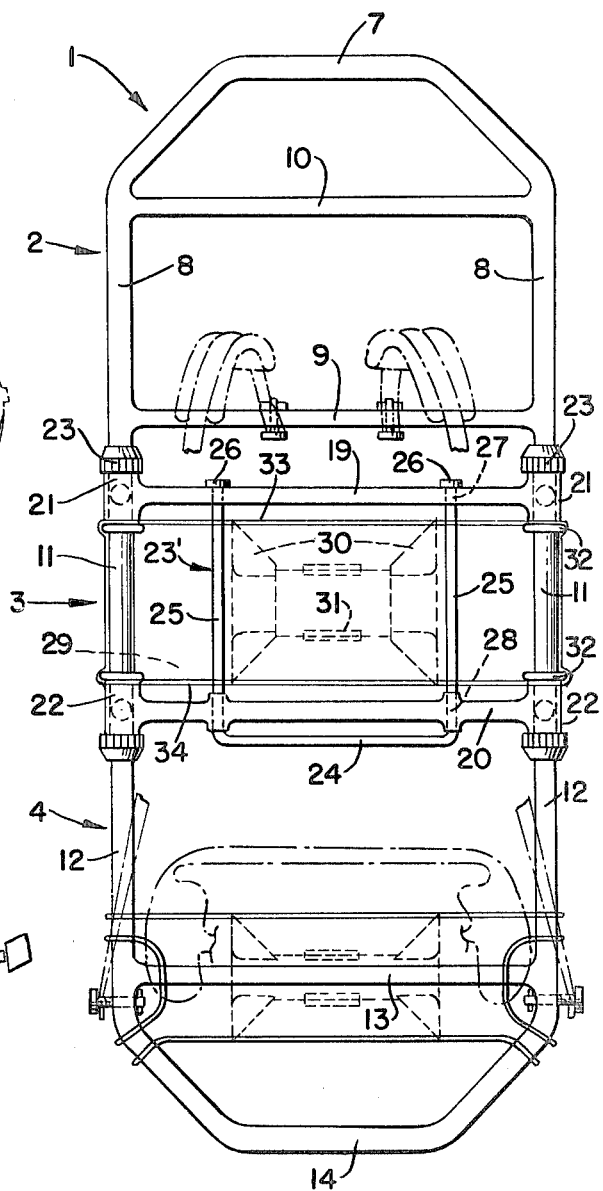

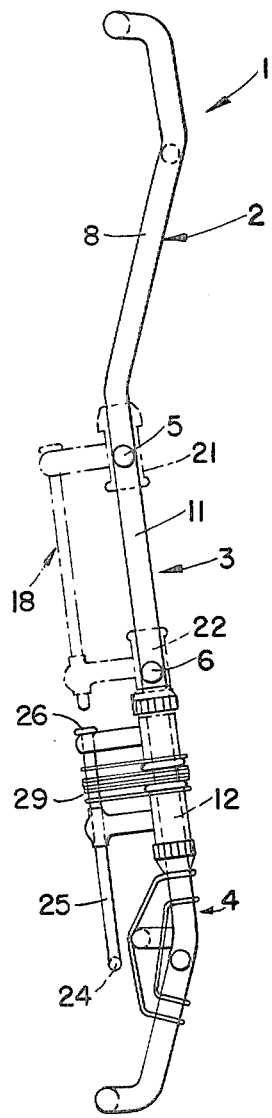
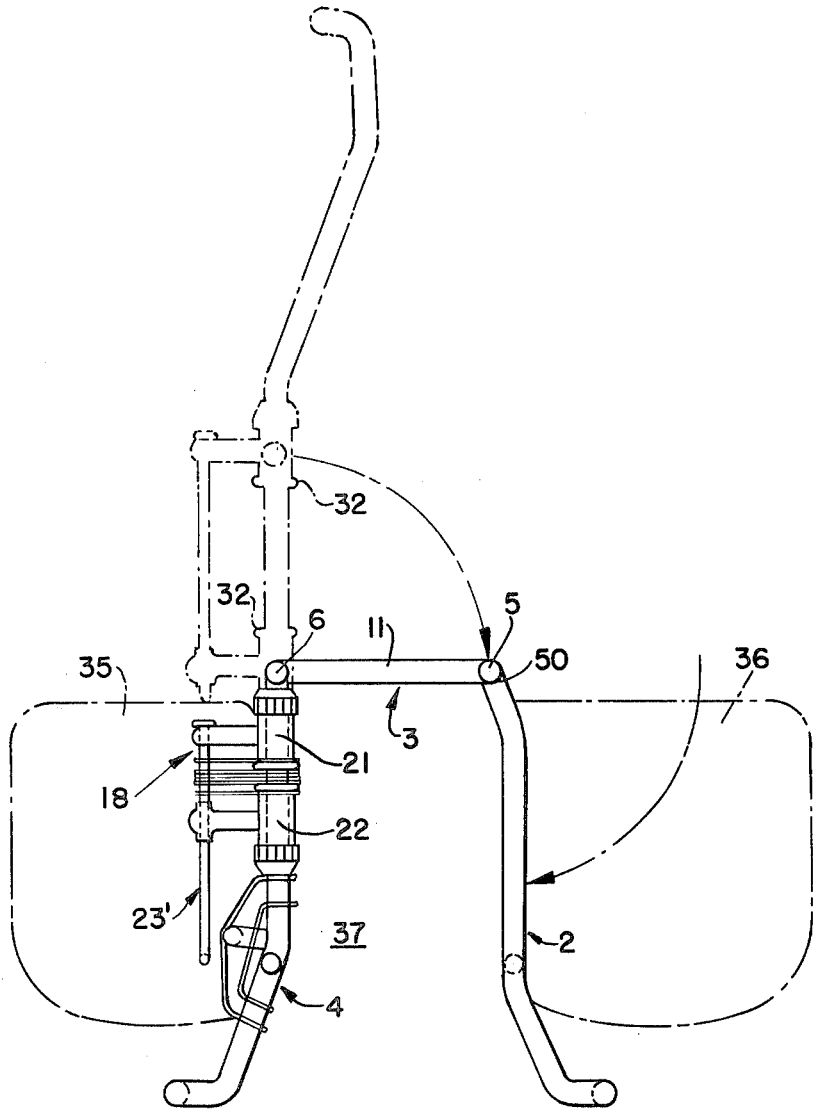
FIG. 3.
FIG. 4.

CONVERTIBLE PACK ASSEMBLY

This invention relates generally to pack assemblies and more particularly to an improved pack frame alternately usable either as a backpack or, when folded or collapsed, as a pack frame adapted to be carried astride a vehicle wheel such as that of a bicycle or motorcycle.

Backpacking activity has become extemely popular recently and numerous pack frames have been devised to provide improved frames to facilitate the support of pack elements upon a user's back. It has long been recognized that to achieve the maximum carrying capacity in a backpack, a frame should comprise an elongated assembly permitting the support of pack elements at a level above the user's shoulder, juxtaposed his back, and adjacent the hips and the frame should be supported not only by means of shoulder straps but also should engage the wearer's back and hips.

By the present invention, an improved elongated frame assembly is provided enabling the carriage of a plurality of packs and which may be readily collapsed to a more condensed volume without the necessity of employing any external tools. In this manner alternate positions of the frame assembly are permissible without removal of the pack elements therefrom and permits the use of the frame assembly either as a backpack or on the other hand, as a frame assembly for carrying the pack elements astride other means of transportation, such as a bicycle or motorcycle.

The foregoing is achieved by means of a unitary, articulated frame assembly including a longitudinally displaceable pack mount which is positioned adjacent a medial frame section when it is desired to lock and retain the frame assembly in its extended or elongated backpack mode but which is unlocked and longitudinally shifted to a collapsed alternate position adjacent a lower frame section when it is desired to pivotally displace or collapse the components of the frame assembly into an alternate, inverted U-shaped configuration adapted to straddle the rear wheel of a vehicle.

Accordingly, one of the objects of the present invention is to provide an improved convertible pack assembly including a plurality of frame sections pivotally connected to one another and alternately displaceable from an extended elongated position serving as a backpack frame, to an alternate collapsed position defining an inverted U-shaped configuration adapted to be carried astride a vehicle wheel.

Another object of the present invention is to provide an improved convertible pack assembly including a plurality of articulated frame sections with a slidable pack mount normally juxtaposed one of the frame sections to secure and retain the pivot joints between the sections in a locked, extended position and longitudinally displaceable along with its supported pack element to a position adjacent another one of the frame sections to allow pivotal displacement of the frame sections into an inverted U-shaped configuration.

A further object of the present invention is to provide an improved convertible pack assembly including a plurality of articulated frame sections with a slidable pack mount having a vertically collapsible back band carried thereby and shiftable from a medial position on the frame assembly to an alternate position overlying an adjacent frame section to allow articulation of the frame section from a longitudinally extended position to an alternate folded position.

Still another object of the present invention is to provide an improved convertible pack assembly including a medial frame section pivotally attached to upper and lower frame sections and including shiftable locking means overlying the joints between the sections to lock same in an extended position but when slidably displaced to another frame section allowing attachment of the medial frame section to horizontal supporting means carried by a vehicle.

With these and other objects in view which will more readily appear as the nature of the invention is better understood, the invention consists of the novel construction, combination and arrangement of parts hereinafter more fully described, illustrated and claimed.

FIG. 1 is a side elevation of a pack assembly according to the present invention;

FIG. 2 is a front elevation of the structure of FIG. 1;

FIG. 3 is a side elevation of the structure of FIG. 1 and illustrates the slidable pack mount in its alternate shifted position;

FIG. 4 is a side elevation of the structure of FIG. 3 illustrating the three sections of the frame assembly when displaced to an alternate position;

Similar reference characters designate corresponding parts throughout the several figures of the drawings.

Figure 5:
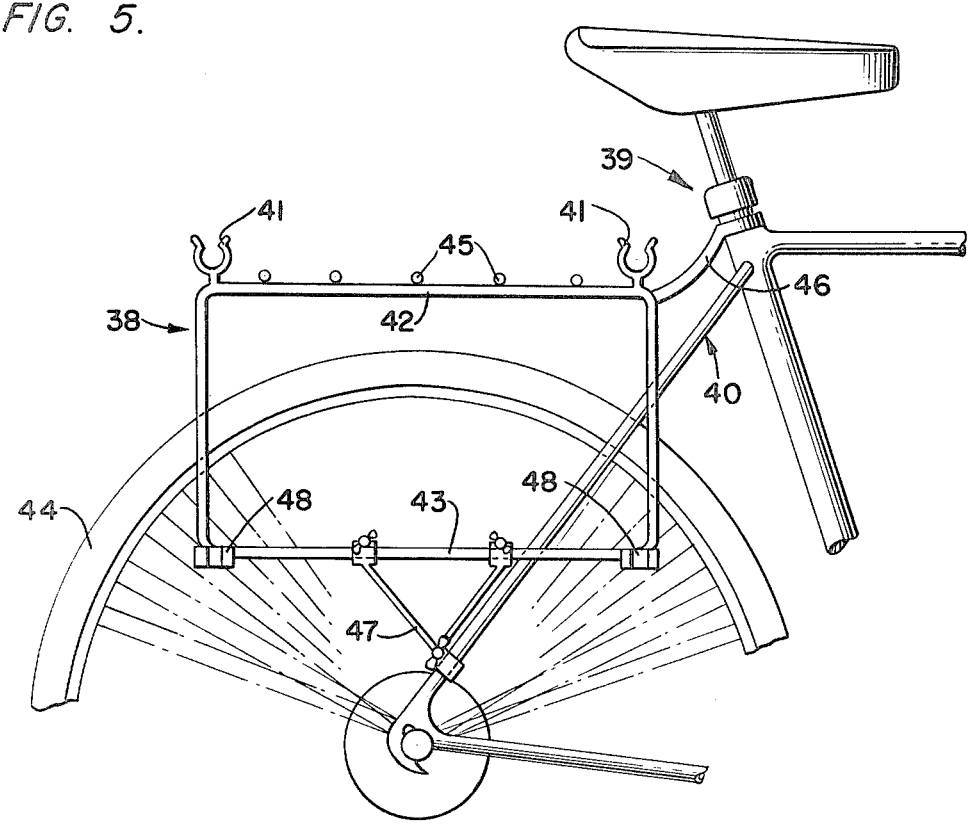
FIG. 5 is a fragmentary side elevation illustrating a typical supporting bracket for accommodating the frame assembly as shown in FIG. 4.

Referring now to the drawings, particularly FIGS. 1 and 2, the present invention will be seen to comprise a convertible pack assembly including a frame assembly, generally designated 1, having a plurality of sub-assemblies respectively designated as an upper frame section 2, medial frame section 3 and lower frame section 4. In essence the frame assembly 1 is a unitary structure with the upper frame section 2 being permanently joined to the medial frame section 3 by means of the upper transverse pivot joints 5 while the medial section 3 is joined to the lower section 4 by means of a lower transverse pivot joint 6. As shown most clearly in FIG. 2 of the drawings, the frame assembly 1 is symmetrical about a central vertical axis with the upper frame section 2 comprising a top end member 7 joined to a pair of spaced apart side braces 8—8 which in turn are transversely braced by means of a first, lowermost cross element 9 and additionally by a second, uppermost cross element 10. The medial frame section 3 comprises a pair of longitudinal side braces 11—11, the opposite ends of which are connected to the upper and lower frame sections 2 and 4 by the aforementioned pivot joints 5 and 6 respectively. The remaining lower frame section 4 includes a pair of spaced apart side braces 12—12 joined by the transversely extending cross member 13 which is disposed adjacent the bottom end member 14.

Figure 6:
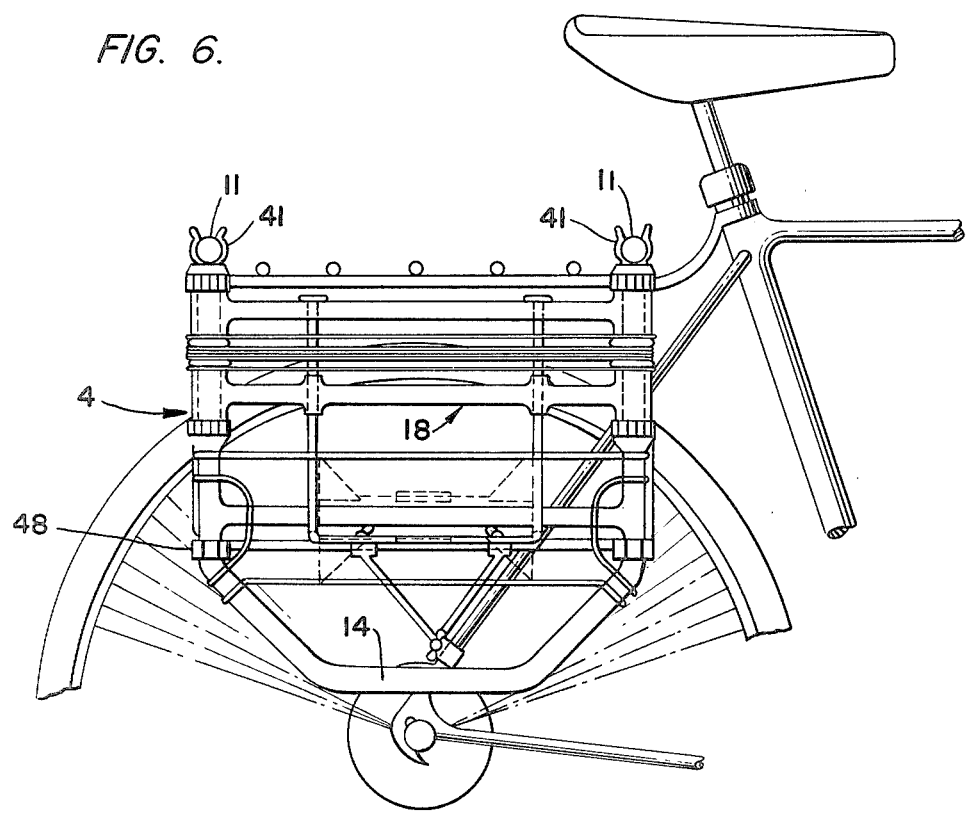
FIG. 6 is a side elevation of the supporting bracket of FIG. 5 and illustrates the frame assembly of FIG. 4 attached thereto.

As shown in FIG. 1 of the drawings, the top of the upper frame section 2 is angularly disposed away from the front 15 of the pack assembly and provides an off-set end portion 16 while a similar off-set end portion 17 is disposed adjacent the bottom of the lower frame section 4. This off-set construction will be understood to serve two purposes. First, adequate body clearance is provided with respect to the user when the frame assembly 1 is employed in the backpack mode as shown in FIGS. 1 and 2 and secondly, when employed in the alternate mode as a vehicle pack assembly straddling the wheel of a vehicle as shown in FIGS. 4 and 6, additional clearance is provided to facilitate both mounting and removal of the pack assembly from the vehicle and also to preclude interference with the structure associated with the vehicle in the area of the wheel axle.

The plurality of frame sections are retained in the extended or elongated backpack mode illustrated in FIGS. 1 and 2 of the drawings by means of a slidable pack mount, generally designated 18 and which includes a top cross member 19 spanning the area between the two longitudinal braces 11—11 in the area of the upper pivot joints 5, as well as the bottom cross member 20 likewise spanning the area between the longitudinal braces 11—11 but in the area of the lower pivot joints 6—6. Affixed to each end of the top cross member 19 are a pair of upper slidable locking sleeves 21—21 while a similar pair of lower slidable locking sleeves 22—22 are affixed to the ends of the bottom cross member 20. All of the sleeves 21 and 22 may be of similar construction and are configured to provide a close sliding fit upon the periphery of the side braces 8, 11 and 12 as will become obvious hereinafter. Thus it will be apparent that the most appropriate configuration for the stock forming the components of the frame assembly is that of cylindrical tubing.

The purpose of the slidable sleeves 21 and 22 is not only to support the remaining components of the shiftable pack mount 18 but also to securely retain and lock together the three sections of the frame assembly in an extended position as illustrated in FIGS. 1 and 2 of the drawings. The side braces of the adjacent frame section will be understood to be retained in an extended or axially aligned manner when the respective sleeves 21,22 each overlie a joint 5 or 6 and the adjacent abutting ends of the underlying side braces. The locking action may be achieved by any well known means such as a compression locking collar 23 suitably threadedly attached (not shown) to one end of each of the sleeves and readily manipulatable to compress the underlying structure of the sleeve in a tight gripping engagement with the tubular frame structure therebeneath.

The cross members 19 and 20 of the pack mount 18 are slidable connected to one another by the shiftable unitary sub-frame generally designated 23' and which includes a transverse connecting rod 24 joined to a pair of vertically extending rods 25—25 each of which terminates in an enlarged head 26 disposed above the top cross member 19 as shown in FIG. 2 of the drawings. The vertical rods 25 are fixedly disposed through openings 27 in the cross member 19 and freely disposed through openings 28 formed in the bottom cross member 20 so as to provide a close sliding fit through the latter member 20.

The two cross members 19 and 20 are preferably off-set or curved rearwardly of the medial frame section 3 as shown in FIG. 1 and cooperate with the longitudinal side braces 11—11 to support a vertically collapsible back band 29 which may be formed of any suitable flexible material the two ends 30—30 of which are tightly drawn together by means of appropriate connecting or biasing elements 31 as shown in FIG. 2.

The opposed ends of the slidable locking sleeves 21 and 22 are preferably provided with a peripheral enlargement 32 to form a shoulder behind which the top edge 33 and bottom edge 34 of the back band 29 is disposed and retained. In this manner, in view of the constant tension being applied to the back band 29 by means of the biasing elements 31, the two edges 33 and 34 of the back band will be retained by the respective locking sleeves 21-22 during use of the pack assembly as well as during subsequent displacement of the shiftable pack mount 18 as will now be described.

When it is desired to convert the frame assembly 1 from the backpack mode as shown in FIGS. 1 and 2, the user merely needs to loosen the locking collars 23 of the four sleeves 21—21, 22—22 after which the slidable pack mount 18 and its associated back band 29 may be easily displaced from the broken line position of FIG. 3 to the full line position shown therein. During this displacement, the upper slidable sleeves 21 as well as the lower slidable sleeves 22 are all longitudinal shifted from a position adjacent the medial frame section 3 and the pivot joints 5 and 6 to a position overlying the longitudinally extending portions of the lower frame section side braces 12—12. During this displacement, the axial distance between each pair of longitudinally adjacent sleeves 21,22 will be seen to be substantially reduced as is also the vertical distance between the top cross member 19 and the bottom cross member 20 of the slidable pack mount 18. The shiftable unitary subframe 23' itself is of course, not collapsible however, in view of the slidable disposition of its vertical rods 25—25, these rods pass through the openings 28 in the bottom cross member 20 to substantially reduce the axial extent of the rods disposed between the cross members 19 and 20. With the resulting juxtaposition of the two peripheral enlargements 32 of each adjacent pair of slidable sleeves 21 and 22 it will follow that the back band 29 will be substantially collapsed when the pack mount 18 is positioned as shown in FIG. 3 of the drawings. The containment of the rear portions of the band edges 33-34 between the rearwardly off-set portions of the two cross members 19 and 20 will be understood to insure the vertical collapse of the band 29 while the sleeve enlargements assist in the expansion of the band when the shiftable mount 18 is returned to the position of FIGS. 1 and 2.

At the same time the pack mount is collapsed, a lower pack element 35 overlying the rear of the band 29 and carried by the pack mount 18, is moved from the medial position of FIG. 1 to the lowered position as shown in FIG. 4 of the drawings. It will be understood that an appropriate upper pack element 36 carried by the upper frame section 2 as shown in FIG. 1 is not affected during the displacement of the slidable pack mount 18. With the relocation of the pack mount 18 to the full line position of FIG. 3, the two pairs of pivot joints 5 and 6 are exposed and no longer retained by the displaced locking sleeves 21 and 22. It now becomes a simple matter to arcuately displace the upper frame section 2 with respect to the medial frame section 3 about the pivot joints 5 and additionally, the medial frame section 3 with respect to the lower frame section 4 about the pivot joints 6 until the frame assembly 1 appears as in FIG. 4 of the drawings. As now positioned, the frame assembly 1 will be seen to provide a substantially symmetrical inverted U-shaped configuration providing an internal vehicle clearance area 37 bounded by the three frame sections. The above disposed frame assembly may now be easily carried by a vehicle by merely attaching the now horizontally disposed longitudinal side braces 11—11 of the medial frame section upon an appropriate vehicle carrier such as the supporting bracket 38 shown in FIGS. 5 and 6 of the drawings.

In these figures, a wheeled vehicle 39 is shown and includes a frame 40 to which is attached the supporting bracket 38 having a pair of uppermost receiving elements or clamps 41—41 for transversely receiving and retaining the frame assembly longitudinal side braces 11—11 therein as shown in FIG. 6.

It will be appreciated that supporting brackets or carriers of various configuration may be employed for securing the pack assembly of FIG. 4 to a wheeled vehicle. In the case of the illustrated bracket 38, pairs of connected upper and lower elements 42 and 43 are joined to one another on opposite sides of the wheel 44 by means of rack elements 45 fixed to the upper elements 45 while an appropriate top brace 46 and bottom brace 47 secure the bracket to the vehicle frame 40. In addition to the horizontally disposed clamps 41 engaging the medial frame section 3 of the pack assembly, vertically disposed clamps 48 are provided in the area of the bracket lower element 43 for engaging the upper and lower frame section side braces on opposite sides of the wheel 44.

When in the vehicle carrying mode of FIGS. 4, 5 and 6, the lower pack element 35 will be understood to be mounted adjacent the lower frame section 4 while the upper pack element 36 remains supported by the upper frame section 2. In this manner each of the two principal pack elements 35-36 are supported by the frame assembly adjacent opposite sides of the vehicle wheel 44. The frame assembly 1 may support an alternative sleeping bag or bottom pack 49 when utilized in the backpack mode as in FIG. 1. The bottom pack 49 may subsequently be easily relocated atop the vehicle supporting bracket 38 and the medial frame section 3 of the pack assembly when transformed into the vehicle transport mode of FIGS. 4-6.

As shown most clearly in FIG. 4, the juxtaposed ends 50 of the side braces 8, 11, 12 in the areas of the joints 5 and 6, are angular or rounded to provide a smooth transition between the three frame sections when disposed in the vehicle transporting mode. An immediate advantage is the provision of clearance for the arc of a bicycle pedal and user's foot and additionally, this arrangement precludes the formation of sharp, square edges which would otherwise be exposed when the pack assembly is utilized in combination with a vehicle and could interfere with the user's legs when mounting or dismounting the vehicle.

I claim:

1. A convertible pack assembly including, a frame assembly including upper, medial and lower frame sections, each said frame section having a pair of laterally spaced apart side braces, transverse pivot joints connecting said frame sections in series, said frame sections displaceable about said pivot joints into a first mode with said frame sections substantially longitudinally aligned, a slidable pack mount provided with a plurality of lockable sleeves overlying said pivot joints when said pack mount is juxtaposed said medial frame section to fixedly retain said pack assembly in the said first mode, said pack mount including top and bottom cross members connecting laterally adjacent pairs of said lockable sleeves, a vertical rod extending from said top cross member and disposed through said bottom cross member, said pack mount and sleeves axially shiftable from juxtaposition said medial frame section to a point juxtaposition said lower frame section with said pack mount being collapsed when shifted to said lower frame section as the axial distance is reduced between said top cross member and its connected sleeves and said bottom cross member and its connected sleeves whereby, said pivot joints are uncovered and said plurality of frame sections are displaceable about said joints to a folded second mode.

2. A convertible pack assembly according to claim 1 including, a flexible back band carried by said pack mount and vertically collapsible when said pack mount is shifted to said lower one of said frame sections.

3. A convertible pack assembly according to claim 1 including, a flexible back band carried by said pack mount, and said back band encircling said vertical rod and said medial frame section side braces when said pack assembly is in said first mode.

4. A convertible pack assembly according to claim 3 wherein, said sleeves include peripheral enlargements at their ends intermediate said top and bottom cross members and said back band includes top and bottom edges overlying said sleeve enlargements.

5. A convertible pack assembly according to claim 1 wherein, said sleeves include manually operable locking collars.

6. A convertible pack assembly according to claim 1 including, an upper pack element carried by said upper frame section, a lower pack element carried by said pack mount and alternately shiftable together with said pack mount between said medial frame section and lower frame section.

7. A convertible pack assembly according to claim 1 wherein said frame assembly defines a substantially symmetrical inverted U-shaped configuration when disposed in said second mode.

8. A convertible pack assembly according to claim 7 wherein, the ends of said side braces at the juncture of said pivot joints are provided with an annular configuration in side elevation whereby, sharp edges at said junctures are avoided when said pack assembly is in said second mode.

9. A convertible pack assembly according to claim 1 including, a pair of said vertical rods joining said top and bottom cross members and disposed parallel to said side braces whereby, said pair of rods insure said cross members remain perpendicular to said side braces during said shifting of said pack mount between said medial and lower frame sections.

10. A convertible pack assembly including, a frame assembly including upper, medial and lower frame sections, each said frame section including a pair of laterally spaced apart side braces, transverse pivot joints connecting said frame sections in series, said frame sections displaceable about said pivot joints into a first mode with said frame sections substantially longitudinally aligned, a slidable pack mount provided with a plurality of lockable sleeves overlying said pivot joints when said pack mount is juxtaposed said medial frame section to fixedly retain said pack assembly in said first mode, said pack mount and sleeves axially shiftable from juxtaposition said medial frame section to a point juxtaposition said lower frame section whereby, said pivot joints are uncovered and said plurality of frame sections are displaceable about said joints to a folded second mode, said pack assembly when in said second mode attachable to a wheeled vehicle having a bracket straddling one said vehicle wheel, and said bracket including clamping means respectively engaging said upper, medial and lower frame sections.

* * * * *